(12) United States Patent
Hill

(10) Patent No.: US 9,946,560 B2
(45) Date of Patent: Apr. 17, 2018

(54) DEVELOPMENT ENVIRONMENT FOR MULTIPLE ELECTRONIC DEVICES

(71) Applicant: Apple Inc., Cupertino, CA (US)

(72) Inventor: Forest A. Hill, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 38 days.

(21) Appl. No.: 14/517,573

(22) Filed: Oct. 17, 2014

(65) Prior Publication Data

US 2016/0062778 A1    Mar. 3, 2016

Related U.S. Application Data

(60) Provisional application No. 62/044,935, filed on Sep. 2, 2014.

(51) Int. Cl.
*G06F 9/455* (2006.01)
*G06F 9/44* (2018.01)
*G06F 11/36* (2006.01)

(52) U.S. Cl.
CPC ............... *G06F 9/455* (2013.01); *G06F 8/00* (2013.01); *G06F 8/20* (2013.01); *G06F 8/34* (2013.01); *G06F 11/36* (2013.01)

(58) Field of Classification Search
CPC .......... G06F 8/20; G06F 8/34; G06F 11/3664; G06F 8/00; G06F 11/36; G06F 9/455
USPC ........................................................ 717/106
See application file for complete search history.

(56) References Cited

U.S. PATENT DOCUMENTS

| 8,239,840 | B1 | 8/2012 | Czymontek | |
|---|---|---|---|---|
| 9,009,674 | B1* | 4/2015 | Haugh | G06F 11/3664 717/125 |
| 2002/0066071 | A1 | 5/2002 | Tien | |
| 2005/0257191 | A1* | 11/2005 | Underseth | G06F 8/30 717/106 |
| 2011/0255379 | A1* | 10/2011 | Vidal | G04G 9/047 368/70 |

(Continued)

FOREIGN PATENT DOCUMENTS

WO    2008/031070 A2    3/2008

*Primary Examiner* — Wei Zhen
*Assistant Examiner* — Mohammed Huda
(74) *Attorney, Agent, or Firm* — Kilpatrick Townsend & Stockton LLP

(57) ABSTRACT

A development device operating system may simulate a first electronic device operating system. A first electronic device application executed by the simulated first electronic device operating system may generate a command for a second electronic device application executed by the simulated first electronic device operating system. A first electronic device framework of the first electronic device application may process the command for the second electronic device application. The processing may transform the command data for the second electronic device application to a form that is usable by a simulated relay module executed by the simulated first electronic device operating system. The simulation relay module may route the command to the second electronic device application. The development device operating system may display data for the second electronic device application on a simulated second electronic device display. The displayed data may be updated based on the command for the second electronic device.

25 Claims, 11 Drawing Sheets

(56) References Cited

U.S. PATENT DOCUMENTS

2013/0291068 A1* 10/2013 Huang .................. G06F 9/5072
726/4

* cited by examiner

DEVELOPMENT ENVIRONMENT FOR MULTIPLE ELECTRONIC DEVICES

CROSS-REFERENCE TO RELATED APPLICATIONS

This application is a non-provisional application of provisional patent application 62/044,935, filed Sep. 2, 2014, entitled "Development Environment for Multiple Electronic Devices," the disclosure of which is incorporated by reference herein in its entirety.

BACKGROUND

The present disclosure relates generally to a development environment for wireless electronic device application development. In particular, the disclosure relates to application development for a first electronic device, such as a user mobile device, and a second electronic device, such as a wearable computer device.

An integrated development environment (IDE) is an application including various features to assist a software development process. Features of an IDE include, e.g., a source code editor, a debugger, a compiler, an interpreter, etc. The IDE can provide information to a developer about potential problems with source code that has been written, reasons that source code fails to compile, status information related to executing source code, output produced by executing source code, etc.

An application may be developed for execution by a first electronic device and a corresponding application may be developed for a second electronic device capable of communicating with the first electronic device. A software developer may benefit from a development environment that is tailored to development of software for a first electronic device and an associated second electronic device.

BRIEF SUMMARY

In accordance with disclosed embodiments, a method is described for a development environment. A development environment may be an application executed by an operating system of a device. The operating system of the development device ("development device operating system") may simulate an operating system of a first electronic device. A first electronic device application executed by the simulated first electronic device operating system may generate a command for a second electronic device application executed by the development device operating system. A first electronic device framework of the first electronic device application may process the command for the second electronic device application. The processing may transform the command data for the second electronic device application to a form that is usable by a simulated relay module executed by the simulated first electronic device operating system. The simulated relay module may route the command to the second electronic device application. The development device operating system may display data for the second electronic device application on a simulated second electronic device display. The displayed data may be updated based on the command for the second electronic device.

In another embodiment, a computing device is described. The computing device includes one or more processors, a display communicatively coupled to the one or more processors, and memory. The computing device additionally includes programs that are stored in the memory and that are configured to be executed by the one or more processors. The one or more processors include instructions for a development device operating system of a device executing a development application to simulate a first electronic device operating system. A first electronic device application executing on the simulated first electronic device operating system generates a command for a second electronic device application executing on the development device operating system. A first electronic device framework of the first electronic device application processes the command for the second electronic device by transforming the command for the second electronic device application to a form that is usable by a simulation relay module executed by the simulated first electronic device operating system. The simulation relay module routes the command data for the second electronic device to the second electronic device application. A display of the computing device displays data for the second electronic device application on a simulated second electronic device display. The displayed data is updated based on the command for the second electronic device.

In a further embodiment, a non-transitory computer readable storage medium is described. The non-transitory computer readable storage medium stores one or more programs. The one or more programs comprise instructions. The instructions, when executed by a computing device with one or more processors, a display, and memory, cause a development device operating system to simulate a first electronic device operating system. The instructions further cause a first electronic device application executing on the simulated first electronic device operating system a command for a second electronic device application executing on the development device operating system. A first electronic device framework of the first electronic device application processes the command for the second electronic device application. The processing generates command data for the second electronic device by transforming the command for the first electronic device application to a form that is usable by a simulation relay module executed by the simulated first electronic device operating system. The simulation relay module routes the command data for the second electronic device to the second electronic device application. A display of the computing device displays data for the second electronic device application on a simulated second electronic device display. The displayed data is updated based on the command for the second electronic device.

A better understanding of the nature and advantages of embodiments of the present invention may be gained with reference to the following detailed description and the accompanying drawings.

DETAILED DESCRIPTION

A first electronic device, such as a portable electronic device, may communicate with a second electronic device, such as a wearable device. An application executed by the first electronic device may provide information to and receive information from a corresponding application executed by the second electronic device.

A developer creating an application for execution by a first electronic device and a corresponding application for execution by a second electronic device will often need to determine whether information is correctly passed between the application executing on first electronic device and the corresponding application executing on second electronic device. The developer will often wish to review the output that the application produces for display by respective displays of first electronic device and second electronic device.

For various reasons, it is advantageous for the developer to use a software development environment capable of simulating communications between first electronic device and second electronic device and/or simulating output to be displayed by the respective devices. For example, it may be inefficient for the developer to install an application on first electronic device and second electronic device each time the application is revised. In another example, a developer may lack access to one or both of first electronic device and second electronic device.

In accordance with embodiments, a development environment can simulate an operating system of a first electronic device in communication with a simulated second electronic device. The development environment can include a relay module as a component of a simulated first electronic device to transform commands into a form usable by the second electronic device. The development environment can also display data that would be displayed by a first electronic device and a second electronic device under the conditions being simulated in the development process. In this way, a developer can develop applications for a second electronic device and a first electronic device without installing the application on physical versions of the first electronic device and the second electronic device.

I. Device Overview

Figure 1:
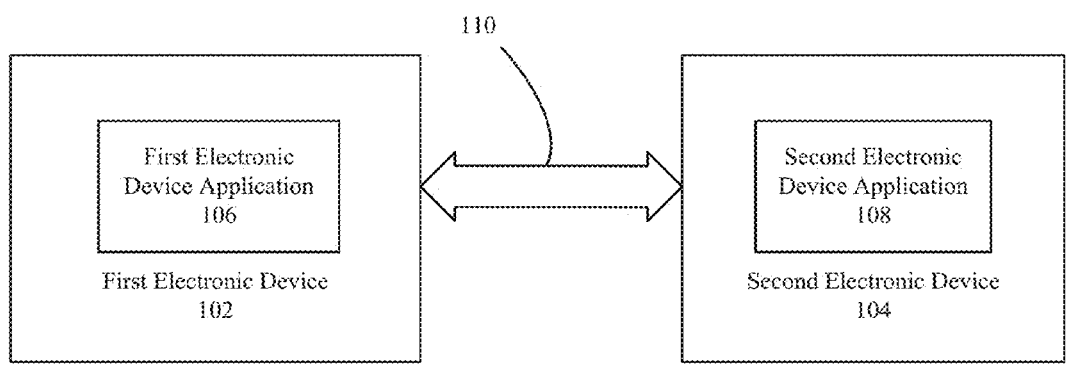
FIG. 1 is a block diagram of a first electronic device and a second electronic device, according to an embodiment.
Figure 2:
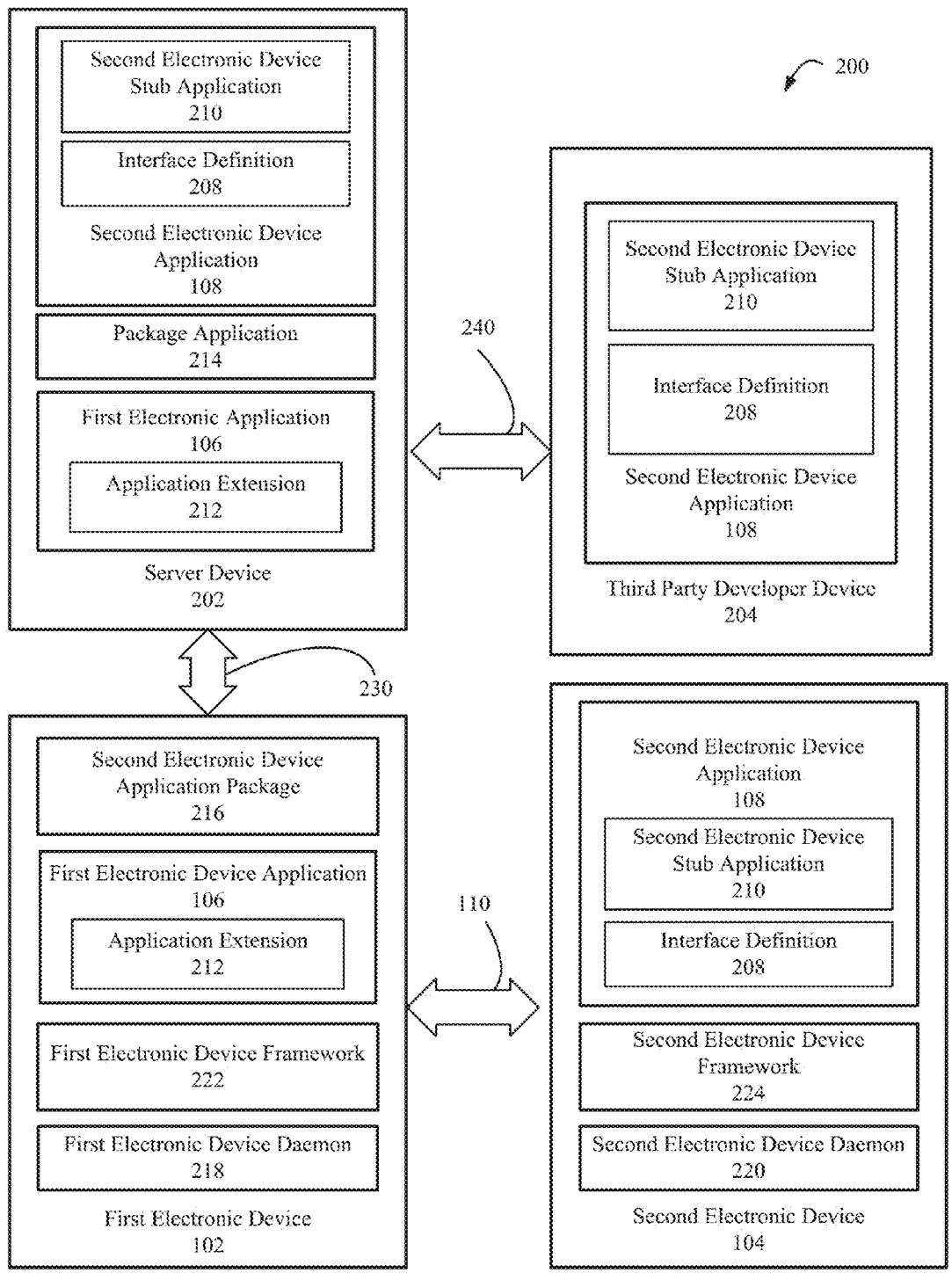
FIG. 2 is a block diagram of multiple computer devices, according to an embodiment.
Figure 3:
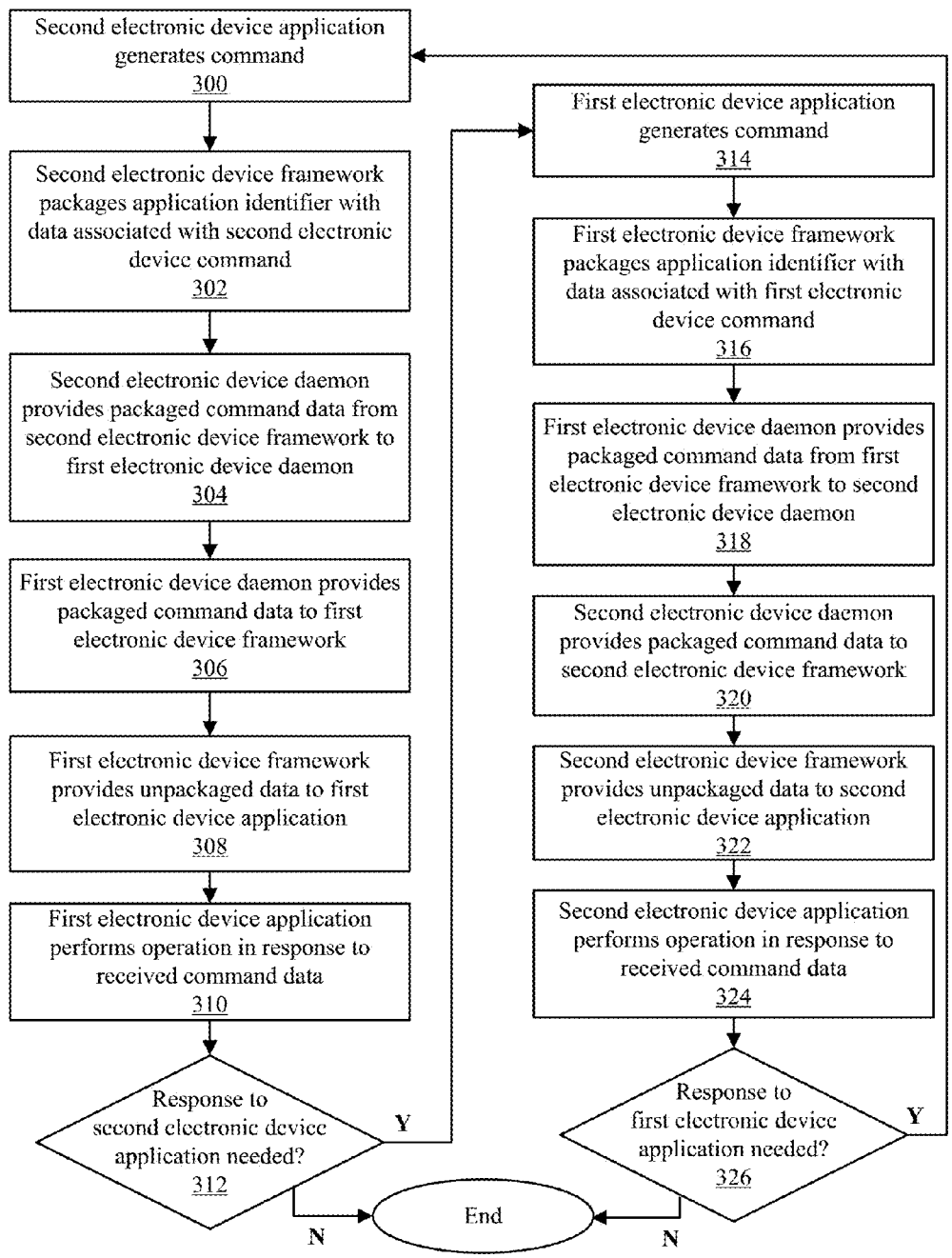
FIG. 3 is a flow diagram indicating operations for communications between a first electronic device and a second electronic device, according to an embodiment.

FIGS. 1-3 describe first and second electronic devices, installation of application software on the devices, and communications between the devices, in accordance with various embodiments. A development environment may simulate various aspects of the systems as described with reference to FIGS. 1-3.

FIG. 1 is a block diagram of a first electronic device and a second electronic device according to an embodiment of the invention.

First electronic device 102 and second electronic device 104 may be portable electronic devices. A portable electronic device may be a device, such as a handheld or wearable device, that is capable of storing and/or accessing information and providing services related to information. Examples of such services can include the storage of personal data such as calendar, contacts, and notes; Internet access; mobile telephony and videoconferencing; the ability to selectively download and run various application programs, etc. Portable electronic devices can include portable media devices capable of managing and/or playing back media assets such as audio, video and still image files.

In some embodiments, second electronic device 104 may have a smaller size compared with first electronic device 102. For example, second electronic device 104 may have a display that is smaller than a display of first electronic device 102. In another example, second electronic device 104 may have limited computing power and/or data storage capacity compared with first electronic device 102. In various embodiments, second electronic device 104 may include features to make the device wearable by a user, such as a wristband, clip, lanyard, etc.

Communication between first electronic device 102 and second electronic device 104 may occur via a communication interface 110. First electronic device 102 and second electronic device 104 may communicate via a wireless communication connection. For example, first electronic device 102 and second electronic device 104 each include radio frequency (RF) transceiver components coupled to an antenna to support wireless communications. Alternatively or additionally, first electronic device 102 and second electronic device 104 may communicate via a wired communication connection.

First electronic device 102 and second electronic device 104 may execute applications 106, 108, respectively. In some embodiments, application 108 executed by second electronic device 104 corresponds to application 106 executed by first electronic device 102. Application 108 may exchange data with application 106, perform functions requested by application 106, request functions to be requested by application 106, etc. For example, application 108 may receive input including a search term. Application 108 may send a command including the search term to application 106, which may perform a search function and send a command including search results to application 108.

Implementation of applications 106 and 108, respectively, on first electronic device 102 and second electronic device 104 is described in more detail with regard to FIG. 2.

FIG. 2 is a block diagram illustrating communication of information associated with applications 106 and 108 between multiple computer devices, according to an embodiment of the invention. The multiple computer devices 200 can include computing server device 202, third party developer device 204, first electronic device 102, and second electronic device 104.

In some embodiments, a third party developer can develop an application using third party developer device 204 and provide the completed application to server 202. Server 202 can package the application for delivery to first electronic device 102. First electronic device 102 can deliver components associated with the application to second electronic device 104.

A third party developer can develop a third-party application 108 for second electronic device 104, e.g., using third party developer device 204. A device used to develop applications for first electronic device 102 and/or second electronic device 104, such as third party developer device 204, may run an operating system, referred to herein as a "development operating system" and "development device operating system." The third party developer can send the second electronic device application 108 to server device 202 using third party developer device 204.

A second electronic device application 108 may include an interface definition file 208 and a stub application 210. Interface definition file 208 may be a text file, e.g., an XML file, that defines information about elements of a graphical user interface for second electronic device 104. For example, interface definition file may provide information about the position, size, shape, appearance, etc. of interface elements, such as buttons, text boxes, etc. Second electronic device stub application 210 may include programming code, such as a script, that upon execution loads a device framework, which includes code to interpret the interface definition file 208 and create display interface elements to provide the second electronic device 104.

The second electronic device application 108 received by server 202 may include an identifier. The identifier may be indicated by identification data in the second electronic device interface definition 208. For example, the identifier may define a second electronic device application name, an assigned number, or other suitable indicia by which all the package components can be understood by a computing device as being associated with the same second electronic device application.

Server 202 can use package application 214 to generate, from received third-party second electronic device application file 108, first electronic device application 106 and first electronic device application extension 212. First electronic device application extension 212 may operate to generate and update display values of the interface elements displayed at second electronic device 104 in accordance with interface definition 208. First electronic device application 106 and first electronic device application extension 212 may be configured for execution by first electronic device 102 to facilitate interoperation with second electronic device application 108 executing on second electronic device 104. The generated first electronic device application 106 and first electronic device extension 212, along with the second electronic device stub application 210 and interface definition 208, can be combined by package application 214 to provide a application package 216.

At the first electronic device 102, the application package 216 for the second electronic device computing device 104 is received from server 202. Package components can be extracted from application package 216 for installation at first electronic device 102 and second electronic device 104. When first electronic device application 106 and application extension 212 have been installed at first electronic device 102 and second electronic device application 108 has been installed at second electronic device 104, the respective applications may be executed by first electronic device 102 and second electronic device 104.

Communications between first electronic device 102 and second electronic device 104 and other operations associated with first electronic device application 106 and second electronic device application 108 may be handled by daemon applications running on the respective devices. A daemon may be an application executed as a background process by a device operating system. First electronic device 102 may include first electronic device daemon 218 and second electronic device 104 may include second electronic device daemon 220. For example, the respective daemons 218, 220 of the devices 102, 104 may handle communications (i.e., route messages) for multiple applications. In an illustrative example of daemon operation, second electronic device daemon 220 may provide information to first electronic device daemon 218 to inform first electronic device 102 that second electronic device application 108 was launched on second electronic device 104.

Communications between daemons 218, 220 may include an application identifier to indicate the application from which a communication originated. Additionally, communications between daemons 218, 220 may include an additional identifier indicating a command type. For example, a header for a message may include a first byte or series of bytes identifying an application and a second byte or series of bytes identifying a command type. Application identifier information may be used by the daemons 218, 220 to route messages to the appropriate application among the multiple applications that might be installed on the devices 102, 104. For example, when application 108 corresponds to application 106, commands received from application 108 may be routed to application 106.

At first electronic device 102, first electronic device framework 222 may act as an intermediary between first electronic device application 106 and first electronic device daemon 218. At second electronic device 104, second electronic device framework 224 may act as an intermediary between second electronic device application 108 and second electronic device daemon 220. A framework may include one or more application programming interfaces (APIs). A framework may translate the data received via a device or an application into a format recognizable by a daemon. For example, when an input is received at a device, the framework may translate data associated with the input into an identifier indicating a command type. The framework may determine an application from which a command was received and package a command type and/or other data with an application identifier for transmission to a daemon.

The double-headed arrows 110, 230, 240 in FIG. 2 indicate connections for communication between the first electronic device 102 and the second electronic device 104, between the server device 202 and the first electronic device 102, and between the third party developer device 204 and the server device 202, respectively. The connections may comprise a wired communication connection, a wireless communication connection, or other communication connection.

FIG. 3 is a flow diagram indicating operations for communications between second electronic device 104 and first electronic device 102.

At operation 300, second electronic device application 108 may generate a command. For example, input may be received at second electronic device 104 when second electronic device 104 is executing application 108. In an illustrative example, a search term may be received at second electronic device 104. Second electronic device 104 may lack software and/or hardware for performing an operation associated with the received input. Second electronic device 104 may provide information associated with the received command to first electronic device 102 in order to use the capabilities of first electronic device 102 for performing an operation, such as performing a search associated with the search term.

At operation 302, second electronic device framework 224 may package an application identifier for second electronic device application 108 with data associated with the second electronic device command. The data associated with the second electronic device command may include a command type identifier (e.g., an identifier indicating that the command is a search request) and/or other data (e.g., the search term).

At operation 304, second electronic device daemon 220 may receive the command data packaged by second electronic device framework 224 and provide the packaged command data to first electronic device daemon 218.

At operation 306, first electronic device daemon 218 may provide the packaged command data to first electronic device framework 222.

At operation 308, first electronic device framework 222 may unpackage the packaged data. For example, first electronic device framework 222 can unpackage the application identifier indicating that the communication originated from second electronic device application 108 (and will be handled by corresponding first electronic device application 106), the command type, and the data associated with the command.

At operation 310, first electronic device application 106 may perform an operation in response to command data received from first electronic device framework 222. For example, first electronic device application 106 may execute a search using a received search term and provide search result data to second electronic device.

At decision diamond 312, first electronic device 102 can determine whether a response to second electronic device application 108 is needed. For example, if the received command is a search request, first electronic device 102 may determine that a response command including search results is needed. If a response is needed, flow may proceed to operation 314. If no response is needed, the flow may end.

At operation 314, first electronic device application 106 can generate command data for second electronic device application 108. For example, search result data responsive to the received search term may be provided to second electronic device application.

At operation 316, first electronic device framework 222 may package an application identifier for second electronic device application 108 with data associated with the first electronic device command. The data associated with the first electronic device command may include a command type identifier (e.g., an identifier indicating that the command is a search response) and/or other data (e.g., the search results).

At operation 318, first electronic device daemon 218 may receive the command data packaged by first electronic device framework 222 and provide the packaged command data to second electronic device daemon 220.

At operation 320, second electronic device daemon 220 can provide the packaged command data to second electronic device framework 224.

At operation 322, second electronic device framework 224 may receive the command data from second electronic device daemon 220 and unpackage the packaged data. For example, second electronic device framework 224 can unpackage the application identifier indicating that the communication is associated with second electronic device application 108, the command type, and the data associated with the command.

At operation 324, second electronic device application 108 may perform an operation in response to command data received from second electronic device framework 224. For example, second electronic device application 108 may display the search result data received from first electronic device 102.

At decision diamond 326, second electronic device 104 can determine whether a response to first electronic device application 106 is needed. If a response is needed, flow may proceed to operation 300. If no response is needed, the flow may end.

It will be recognized that the flow diagram may begin at operation 314 in lieu of beginning at operation 300.

II. Development Environment

Below, a development environment is described that simulates various aspects of the systems and operations described with regard to FIGS. 1-3. The development environment may allow a developer creating an application 106 for execution by a first electronic device 102 and a corresponding application 108 for execution by a second electronic device 104 to determine whether information is correctly passed between the applications 106 and 108. The development environment may also allow a developer to review the output that applications 106 and/or 108 produce for display by respective displays of first electronic device 102 and second electronic device 104. In this way, a developer can determine whether software is executing as intended without needing to install applications on first electronic device 102 and second electronic device 104.

Figure 4:
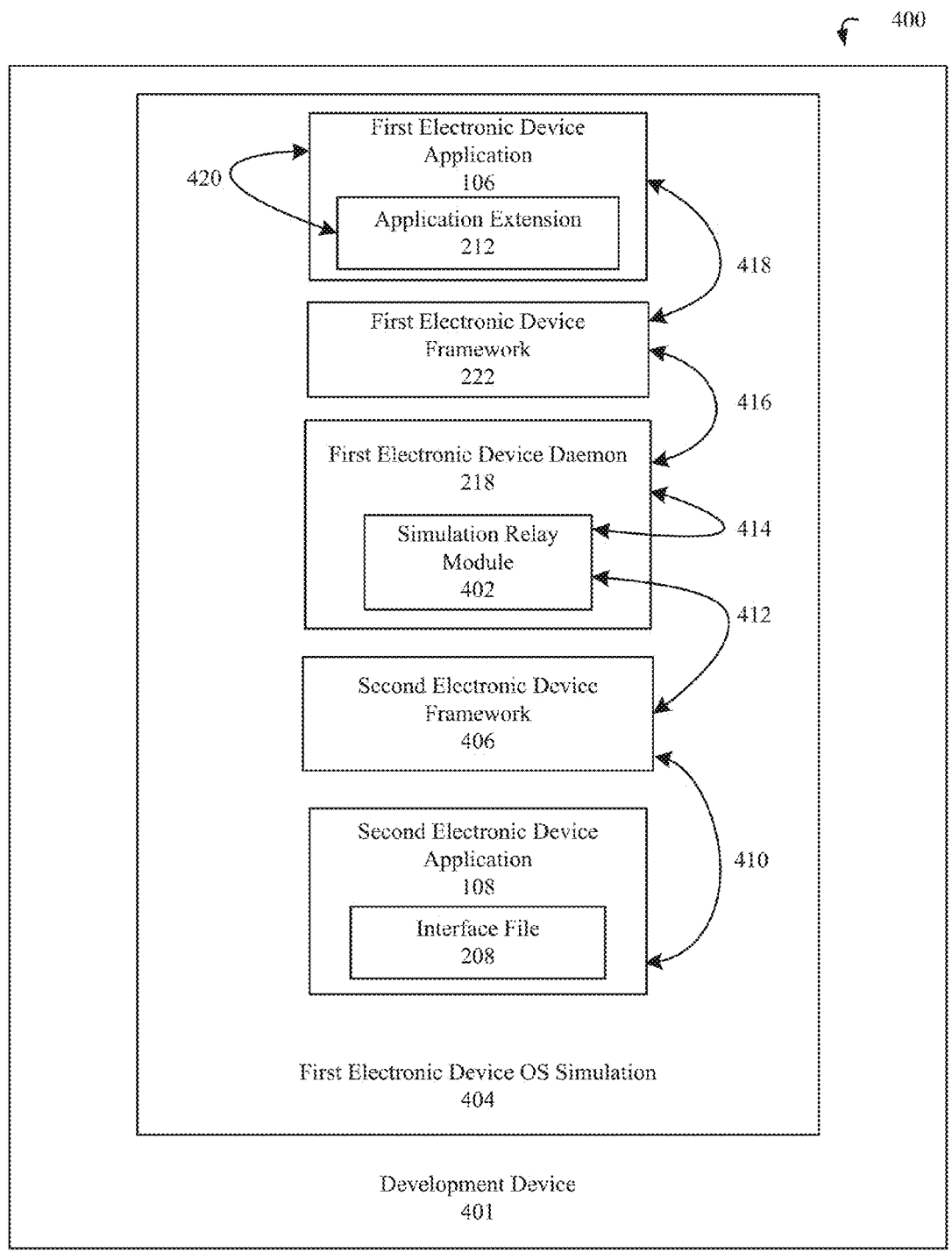
FIG. 4 is a block diagram of a development environment, according to an embodiment.

FIG. 4 is a block diagram of a development environment, according to an embodiment of the invention.

Development environment 400 may be executed by an operating system of development device 401. Development device 401 may be a computing device, such as third party developer device 204. Development environment 400 may be an integrated development environment (IDE) application including various features to assist a developer with software development.

Development environment 400 can simulate a first electronic device 102 operating system, communications between applications executed by first electronic device 102 and second electronic device 104, and output to be displayed by first electronic device 102 and second electronic device 104, enabling a developer to develop applications for first electronic device 102 and a second electronic device 104. In this way, development of an application for first electronic device 102 and a second electronic device 104 can be performed using a development device 401, such as a personal computer, that can simulate the functionality of first electronic device 102 and a second electronic device 104.

Development device 401 can simulate an operating system (OS) of first electronic device 102, as shown at first electronic device OS simulation 404. For example, development device 401 may be a computer executing an OS (e.g., OS X®) and first electronic device OS simulation 404 may be a simulation of a different OS (e.g., iOS®). First electronic device OS simulation 404 may execute first electronic device application 106, application extension 212, first electronic device framework 222, first electronic device daemon 218, a simulated second electronic device framework 406, and a second electronic device application 108.

To simulate communications between first electronic device 102 as simulated by first electronic device OS simulation 404 and second electronic device 104, first electronic device OS simulation may include simulation relay module 402. In some embodiments, simulation relay module 402 may be a component of first electronic device daemon 218 as simulated by first electronic device OS simulation 404. Simulation relay module 402 may be a software module that performs operations that would be performed by second electronic device daemon 220 of second electronic device 104. For example, simulation relay module 402 can implement the protocol of second electronic device daemon 220 to handle commands received from first electronic device daemon 218.

The communications described with reference to FIG. 3 may be performed by development device 401 using first electronic device OS simulation 404 in lieu of first electronic device 102, simulation relay module 402 in lieu of second electronic device daemon 220, and simulation second electronic device framework 406 in lieu of second electronic device framework 224. Simulation second electronic device framework 406 may be a second electronic device framework 224 as simulated by first electronic device OS simulation 404. Second electronic device application 108 may be executed by development device 401, e.g., simulated within first electronic device OS simulation 404, to exchange communications and otherwise interoperate with one or more modules of first electronic device OS simulation 404.

A command generated by second electronic device application 108 may be passed to simulation second electronic device framework 406 as indicated at double-ended arrow 410. Simulation second electronic device framework 406 may pass packaged command data to simulation relay module 402 as indicated at double-ended arrow 412. Simulation relay module 402 may be configured to handle command data as second electronic device daemon 220 would handle the command data. Simulation relay module 412 may pass the command data to first electronic device daemon 218, as indicated at double-ended arrow 414. First electronic device daemon 218 may send command data to first electronic device framework 222 as indicated at double-ended arrow 416. First electronic device framework 222 may unpackage the command data and send command data to first electronic device application 106, as indicated at double-ended arrow 418.

In another example, application extension 212 of first electronic device application 106 of the first electronic device OS simulation can generate an interface to be displayed by second electronic device 104. Application extension 212 can communicate with second electronic device application 108 via first electronic device application 106, first electronic device framework 222, simulation relay module 402, first electronic device daemon 218, simulation second electronic device framework 406 to generate an interface using interface filed 208, as indicated at arrows 410-420. Development device 401 can display a graphical user interface that would be displayed by second electronic device 104 based on the interface file as generated and updated by application extension 212.

Figure 5:
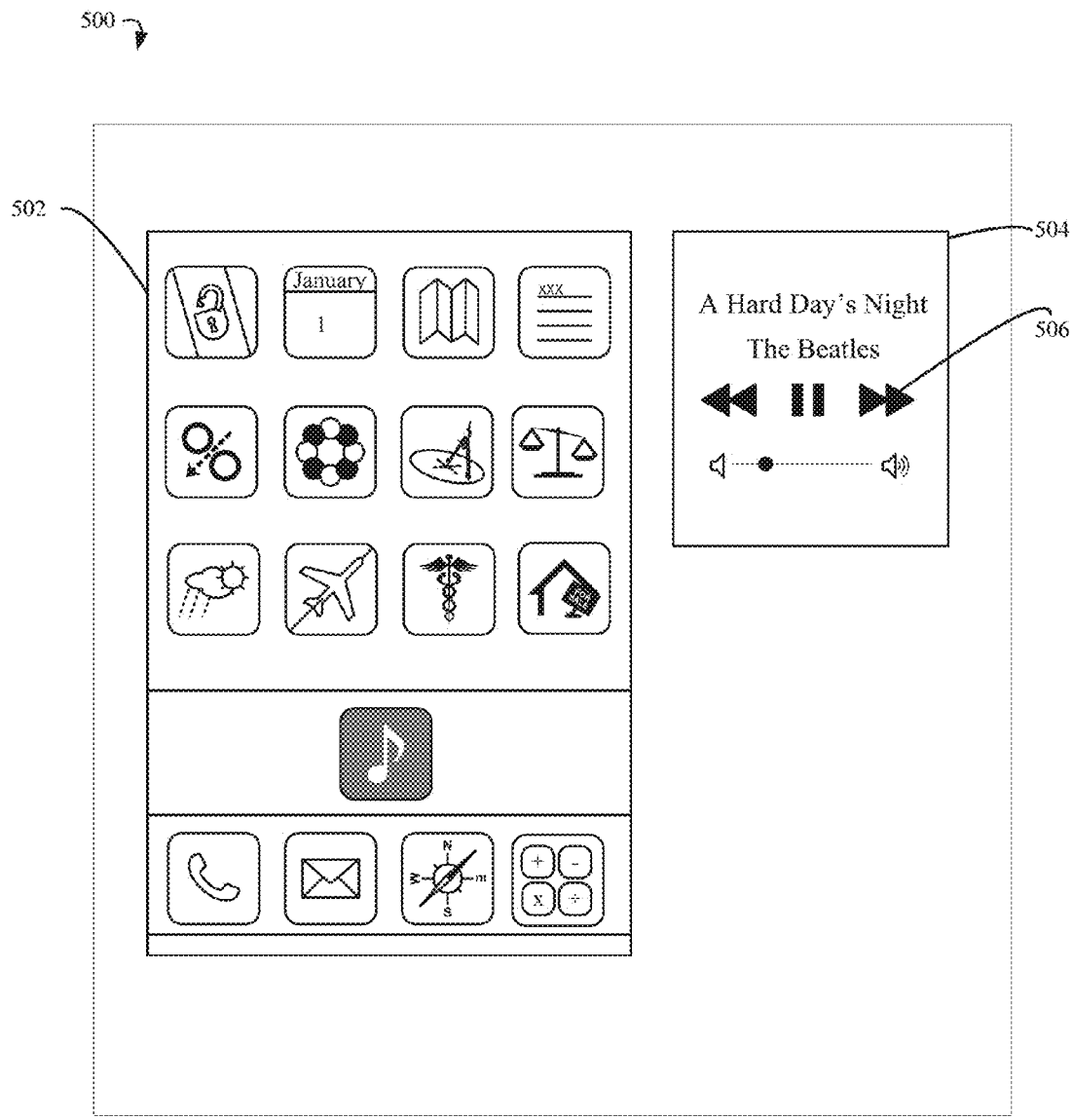
FIG. 5 is an illustrative screen shot of a graphical user interface shown in a development environment, according to an embodiment.

FIG. 5 is an illustrative screen shot 500 of a graphical user interface shown by development environment application 400 at a display of development device 401. An illustrative display of simulated first electronic device 404 is shown at 502. An illustrative simulated second electronic device display is shown at 504. A developer can view the simulated first electronic device display 502 and simulated second electronic device display 504. e.g., to determine if the interface file 208 creates the desired interface for second electronic device 104, to determine if the operations of commands passed between first electronic device 102 and second electronic device 104 are properly reflected on the respective displays of the devices, etc.

Figure 6:
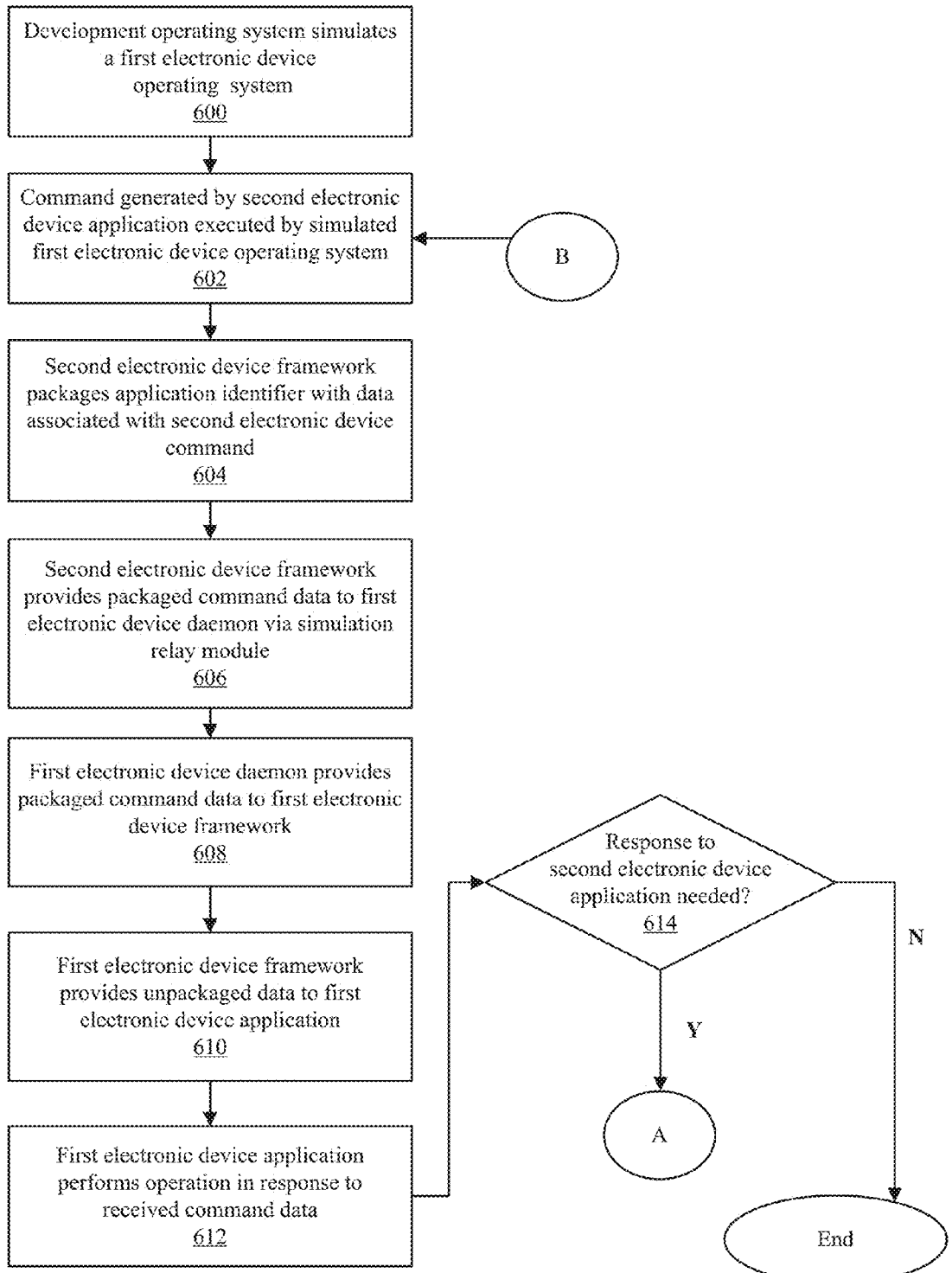
FIGS. 6-7 are flow diagrams indicating exemplary operations for simulating a first electronic device and a second electronic device in a development environment.

FIG. 6 is a flow diagram indicating exemplary operations for simulating a first electronic device and a second electronic device in a development environment.

At operation 600, development device operating system of development device 401 can execute a simulated first electronic device operating system 404.

At operation 602, second electronic device application 108, executed by first electronic device OS simulation 404, can generate command data for first electronic device application 1086. For example, second electronic device application 108 may receive an input at an icon (e.g., fast forward icon 506) indicating a request to advance media playback to a next track in a playlist.

At operation 604, simulation second electronic device framework 406, executed by first electronic device OS simulation 404, may package an application identifier for second electronic device application 108 with data associated with the second electronic device command. For example, the application identifier may be an identifier associated with a media playback application and data associated with the second electronic device command may be an indication that the command is an "advance track" command.

At operation 606, simulation relay module 402 of first electronic device daemon 218 may receive the command data packaged by simulation second electronic device framework 406 and provide the packaged command data to first electronic device daemon 218.

At operation 608, first electronic device daemon 218 can provide the packaged command data to first electronic device framework 222.

At operation 610, first electronic device framework 222 may unpackage the packaged data.

At operation 612, first electronic device application 106 executed by simulated first electronic device operating system 404 may perform an operation in response to command data received from first electronic device framework 222. For example, first electronic device application 106 may perform an operation that requests playback of a next track in a playlist. In some embodiments, first electronic device application 106 may update a graphical user interface displayed by first electronic device OS simulation 404 in response to a received command. The results of the operation may be viewable at simulated first electronic device display 502 of a graphical user interface 500 of development device 401.

At decision diamond 614, first electronic device application 106 executed by simulated first electronic device operating system 404 can determine whether a response to second electronic device application 108 is needed. For example, first electronic device application 106 may determine that a response command is needed to provide second electronic device application 108 with metadata associated with a next track for playback. If a response is needed, flow may proceed to operation 702, as indicated at A. If no response is needed, the flow may end.

Figure 7:
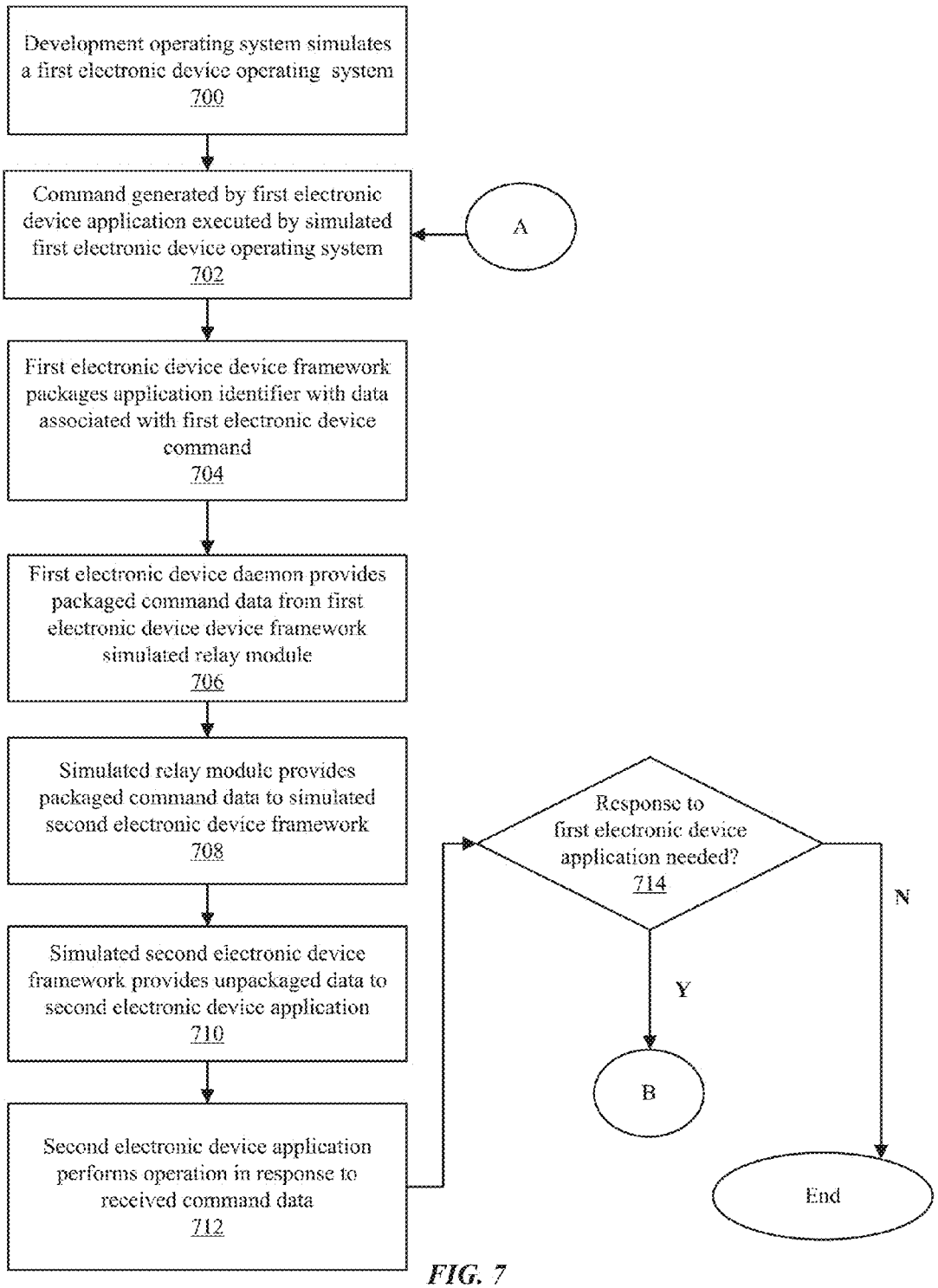

FIG. 7 is a flow diagram indicating exemplary operations for simulating a first electronic device and a second electronic device in a development environment.

At operation 700, development device operating system of development device 401 can execute a simulated first electronic device operating system 404.

At operation 702, first electronic device application 106 executed by simulated first electronic device operating system 404 can generate command data for second electronic device application 108. For example, first electronic device application 106 may generate a command to provide second electronic device application 108 with metadata associated with a next track for playback.

At operation 704, first electronic device framework 222 may package an application identifier for second electronic device application 108 with data associated with the first electronic device command.

At operation 706, first electronic device daemon 218 executed by simulated first electronic device operating system 404 may receive the command data packaged by first electronic device framework 222 and provide the packaged command data to simulation relay module 402 of first electronic device daemon 218.

At operation 708, simulation relay module 402 may provide the packaged command data to simulation second electronic device framework 406 executed by the operating system of development device 401.

At operation 710, simulation second electronic device framework 406 may unpackage the packaged data.

At operation 712, second electronic device application 108 executed by simulated first electronic device operating system 404 may perform an operation in response to command data received from simulation second electronic device framework 224. For example, second electronic device application 108 may update the display of simulated second electronic device display 504 to display metadata associated with a next track to be played back. The results of the operation may be viewable at simulated second electronic device display 504 of a graphical user interface 500 of development device 401.

At decision diamond 714, second electronic device application 108 can determine whether a response to first electronic device application 106 is needed. If a response is needed, flow may proceed to operation 602, as indicated at B. If no response is needed, the flow may end.

III. Device Configurations

Figure 8:
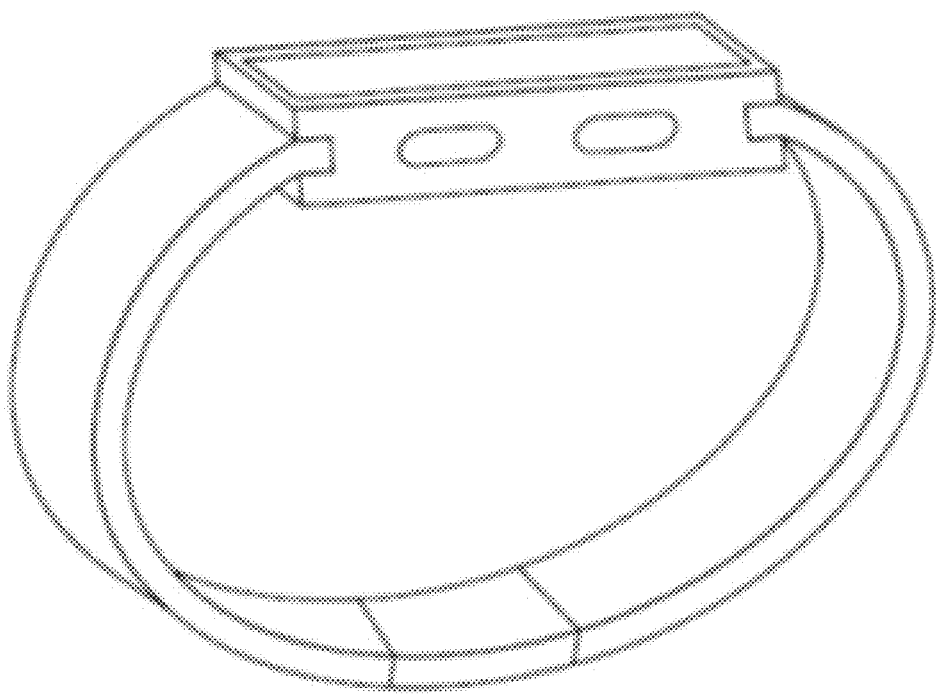
FIG. 8 shows an example of a second electronic device, according to an embodiment.

Embodiments described herein, such as first electronic device 102 and second electronic device 104, may take the form of, be incorporated in, or operate with a suitable electronic device. One example of such a device is shown in FIG. 8 and takes the form of a wearable mechanism. As shown, the mechanism may be worn on a user's wrist and secured thereto by a band. The mechanism may have a variety of functions including, but not limited to: keeping time; monitoring a user's physiological signals and providing health-related information based on those signals; communicating (in a wired or wireless fashion) with other electronic devices, which may be different types of devices having different functionalities; providing alerts to a user, which may include audio, haptic, visual and/or other sensory output, any or all of which may be synchronized with one another; visually depicting data on a display; gathering data form one or more sensors that may be used to initiate, control, or modify operations of the device; determining a location of a touch on a surface of the device and/or an amount of force exerted on the device, and use either or both as input; accepting voice input to control one or more functions; accepting tactile input to control one or more functions; and so on.

Alternative embodiments of suitable electronic devices include a phone; a tablet computing device; a portable media player; and so on. Still other suitable electronic devices may include laptop/notebook computers, personal digital assistants, touch screens, input-sensitive pads or surfaces, and so on.

Figure 9:
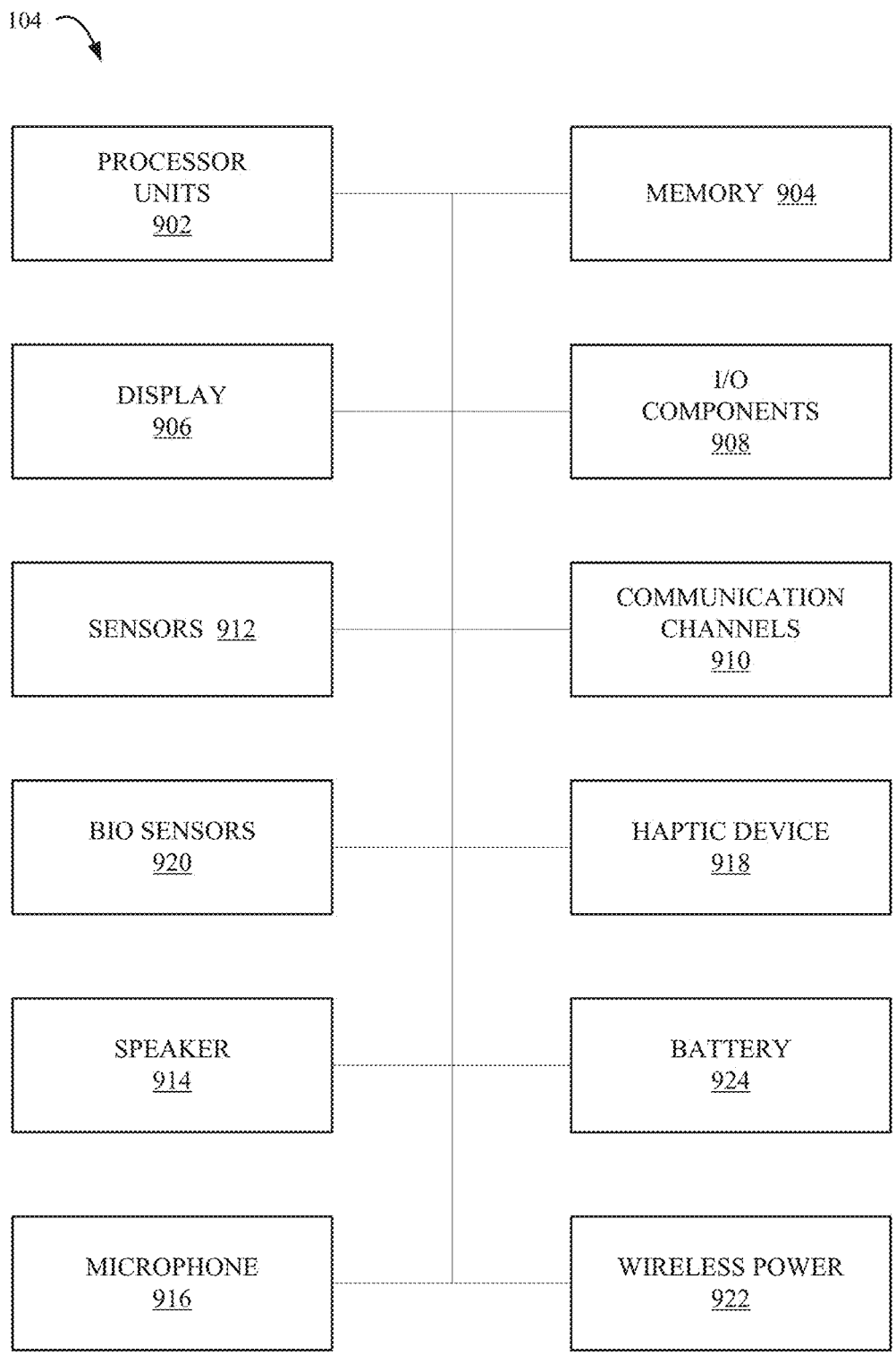
FIG. 9 is a schematic diagram of a second electronic device, according to an embodiment.

FIG. 9 depicts an example schematic diagram of a second electronic device. As shown in FIG. 9, second electronic device 104 includes one or more processing units 902 that are configured to access a memory 904 having instructions stored thereon. The instructions or computer programs may be configured to perform one or more of the operations or functions described with respect to second electronic device 104. For example, the instructions may be configured to control or coordinate the operation of the various components of the device. Such components include, but are not limited to, display 906, one or more input/output components 908, one or more communication channels 910, one or more sensors 912, a speaker 914, microphone 916, and/or one or more haptic feedback devices 918. In some embodiments, speaker 914 and microphone 916 may be combined into a single unit and/or may share a common port through a housing of the device.

The processing units 902 of FIG. 9 may be implemented as any electronic device capable of processing, receiving, or transmitting data or instructions. For example, the processing units 902 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments the electronic device may accept a variety of bands, straps, or other retention mechanisms (collectively, "bands"). These bands may be removably connected to the electronic device by a lug that is accepted in a recess or other aperture within the device and locks thereto. The lug may be part of the band or may be separable (and/or separate) from the band. Generally, the lug may lock into the electronic device's recess and thereby maintain connection between the band and device. The user may release a locking mechanism to permit the lug to slide or otherwise move out of the recess. In some embodiments, the recess may be formed in the band and the lug may be affixed or incorporated into the device.

A user may change combinations of bands and electronic devices, thereby permitting mixing and matching of the two categories. It should be appreciated that devices having other forms and/or functions may include similar recesses and may releasably mate with a lug and/or band incorporating a lug. In this fashion, an ecosystem of bands and devices may be envisioned, each of which is compatible with another. A single band may be used to connect to devices, as one further example; in such embodiments the band may include electrical interconnections that permit the two devices to transmit signals to one another and thereby interact with one another.

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

The device sensors 912 also may comprise one or more touch sensors to determine a location of a touch on the cover glass. A touch sensor may be incorporated into or on the display stack in order to determine a location of a touch. The touch sensor may be self-capacitive in certain embodiments, mutual-capacitive in others, or a combination thereof.

Similarly, the device sensors 912 may include a force sensor to determine an amount of force applied to the cover glass. The force sensor may be a capacitive sensor in some embodiments and a strain sensor in other embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

The electronic device may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. Second electronic device 104 may include a haptic device 918, such as a haptic actuator. The haptic actuator may be housed within second electronic device 104 and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

Second electronic device 104 may communicate with other electronic devices, such as first electronic device 102, either through a wired connection or wirelessly. Data may be passed between devices, permitting one device to relay information to another; control another, employ another's sensors, outputs, and/or inputs; and so on.

Figure 10:
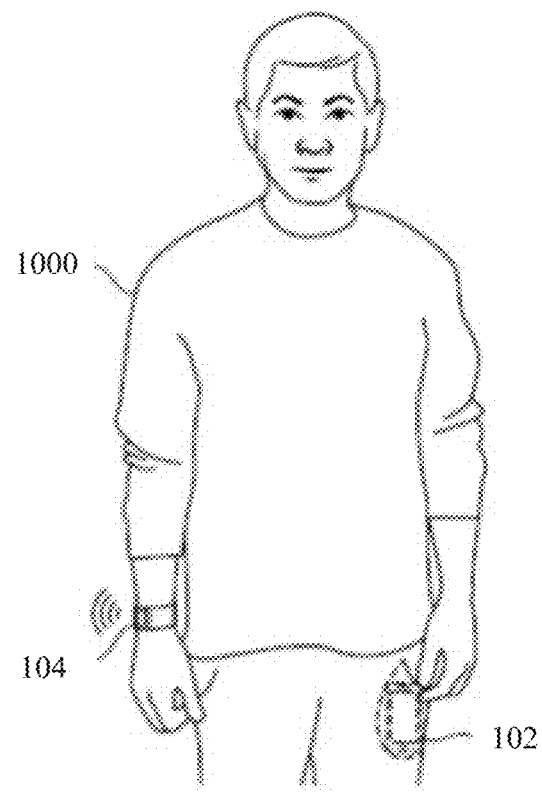
FIG. 10 shows a user, second electronic device, and first electronic device, according to an embodiment.

FIG. 10 depicts a user 1000 wearing an exemplary second electronic device 104, with exemplary first electronic device 102 in his pocket. Data may be wirelessly transmitted between the electronic devices 102, 104, thereby permitting the user 1000 to receive, view, and interact with data from the first electronic device 102 by means of the second electronic device 104. Thus, the user 1000 may have access to part or all of the second device's functionality through the second electronic device 104 without actually needing to interact directly with first electronic device 102.

Further, the electronic devices 102, 104 may cooperate not only to share data but to share functionality as well. For example, one of the two devices may incorporate a sensor, application, or function that the other lacks. The electronic device lacking such capabilities may request them from the other device, which may share wirelessly with the requesting device. Thus, multiple devices may operate together to provide expanded functions, software, access and the like between the two and ultimately to a user. As one non-limiting example, the second electronic device 104 may be unable to place or receive telephone calls while the second device 102 may be able to do so. A user may nonetheless make and/or receive calls through second electronic device 104, which may employ first electronic device 102 to actually place or accept a call.

As another non-limiting example, second electronic device 104 may wirelessly communicate with a sales terminal nearby, thus permitting a user to quickly and efficiently conduct a transaction such as selling, buying, or returning a good. The electronic device may use near field communications technology to perform these and other functions.

As mentioned above, a band may be connected to two electronic devices and may serve as a wired communication path between the two. As another example, the devices may communicate wirelessly, thereby permitting one device to relay information from a second to a user. This latter example may be particularly useful when the second is inaccessible.

Certain embodiments may incorporate one or more biometric sensors 920 to measure certain physiological characteristics of a user. The device may include a photoplethysmogram sensor to determine a user's heart rate or blood oxygenation levels, for example. The device may also or instead include electrodes to measure the body impedance of a user, which may permit the device to estimate body fat percentages, the body's electrical activity, body impedance, and so on. Also include blood pressure, ultraviolet exposure, etc. Depending on the sensors incorporated into or associated with the electronic device, a variety of user characteristics may be measured and/or estimated, thereby permitting different health information to be provided to a user.

Certain embodiments may be wirelessly charged, e.g., via wireless power module 922. For example, an inductive charging base may transmit power to an inductive receiver within the device in order to charge a battery 924 of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes.

In certain embodiments, the device may include a rotary input, which may take the form of a crown with a stem. The crown and stem may be rotated to provide the rotary input. Rotation of the stem and/or crown may be sensed optically, electrically, magnetically, or mechanically. Further, in some embodiments the crown and stem may also move laterally, thereby providing a second type of input to the device.

The electronic device may likewise include one or more buttons. The button(s) may be depressed to provide yet another input to the device. In various embodiments, the button may be a dome switch, rocker switch, electrical contact, magnetic switch, and so on. In some embodiments the button may be waterproof or otherwise sealed against the environment.

Various embodiments of sensors 912 may include or otherwise incorporate one or more motion sensors. A motion sensor may detect motion of the device and provide, modify, cease, or otherwise affect a state, output, or input of the device or associated applications based on the motion. As non-limiting examples, a motion may be used to silence the device or acknowledge an alert generated by the device. Sample motion sensors include accelerometers, gyroscopic sensors, magnetometers, GPS sensors, distance sensors, and so on. Some embodiments may use a GPS sensor to facilitate or enable location and/or navigation assistance.

As shown in FIG. 9, the device 104 may also include one or more acoustic elements, including a speaker 914 and/or a microphone 916. The speaker 914 may include drive electronics or circuitry and may be configured to produce an audible sound or acoustic signal in response to a command or input. Similarly, the microphone 916 may also include drive electronics or circuitry and is configured to receive an audible sound or acoustic signal in response to a command or input. The speaker 914 and the microphone 916 may be acoustically coupled to port or opening in the case that allows acoustic energy to pass, but may prevent the ingress of liquid and other debris.

Certain embodiments of sensors 912 may incorporate an ambient light sensor. The ambient light sensor may permit the device to sense a brightness of its environment and adjust certain operational parameters accordingly. For example, the electronic device may modify a brightness of a display in response to the sensed ambient light. As another example, the electronic device may turn the display off if little or no light is sensed for a period of time.

These and other functions, operations, and abilities of second electronic device 104 will be apparent upon reading the specification in its entirety. Various embodiments of first electronic device 102 may include any of the components described with regard to FIG. 9.

Figure 11:
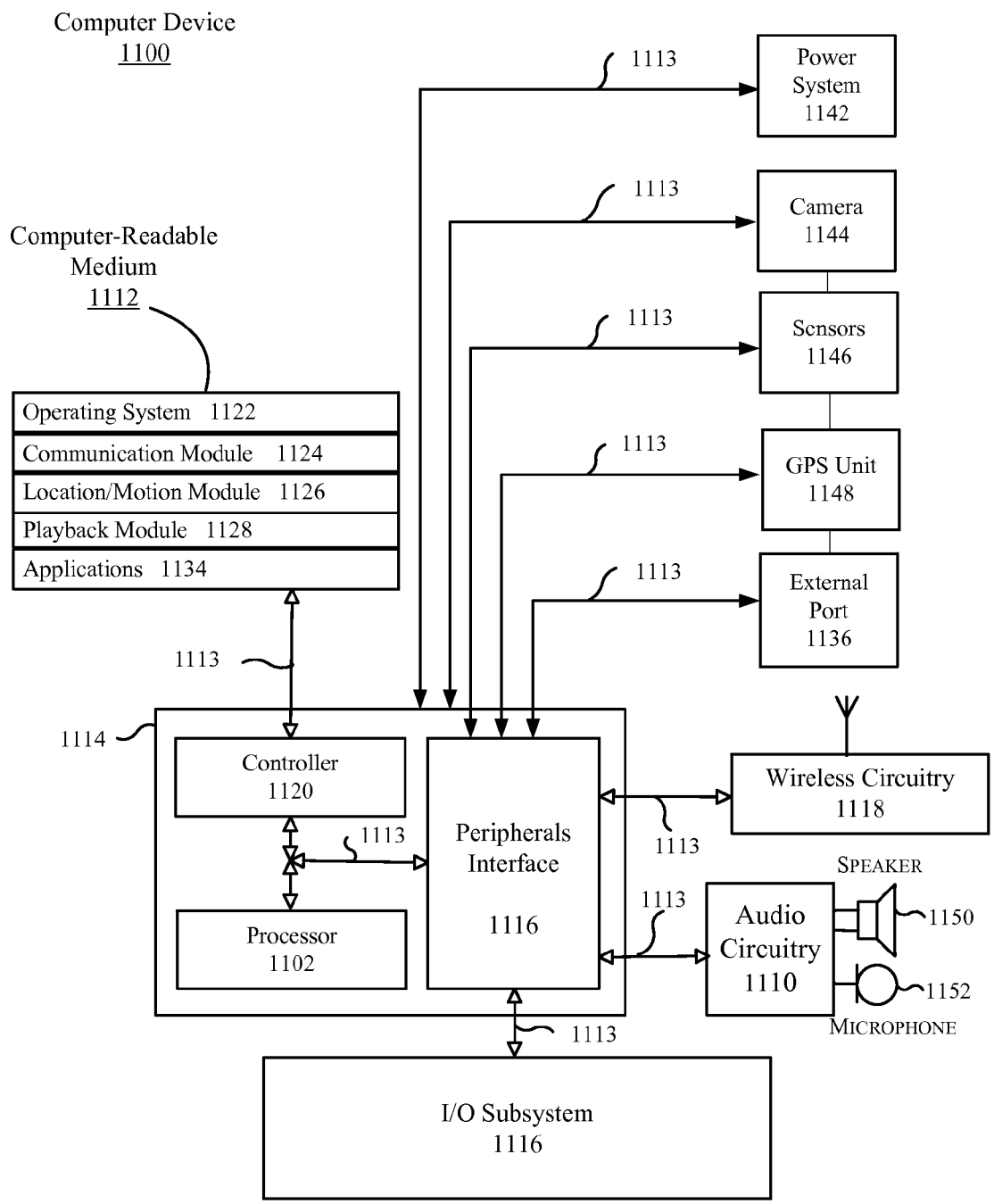
FIG. 11 is a block diagram of a computer device according to an embodiment.

FIG. 11 is a block diagram of a computer device 1100 according to an embodiment of the invention. The computer device 1100 may comprise any of the devices illustrated in FIGS. 1-2 and 4-5, although those skilled in the art will understand that some components of the device 1100 may not be included, depending on the nature of the device. For example, if the computer device is a desktop computer or second electronic device, it might not include the GPS unit, as movement is not likely in the case of a desktop computer, and the limited repertoire of resources on a second electronic device would not likely include a GPS unit.

The computer device 1100 generally includes a computer-readable medium 1112, a processing system 1114, an Input/Output (I/O) subsystem 1116, wireless circuitry 1118, and audio circuitry 1110 including a speaker 1150 and a microphone 1152. These components may be coupled by one or more communication buses or signal lines 1113. The device 1100 can be any electronic computer device, including a wearable computer device, a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items. As examples, a wearable device can comprise a wrist worn device, a device that is clipped or pinned to the user's clothing, a device with a lanyard or chain that is wearable around the user's neck, a headband device, eyeglasses, or any other device that can be secured to the user's person or clothing.

It should be apparent that the architecture shown in FIG. 11 is only one example of an architecture for the computer device 1100, and that the device 1100 can have more or fewer components than shown, or a different configuration of components. The various components shown in FIG. 11 can be implemented in hardware, software, or a combination of both hardware and software, including one or more signal processing and/or application specific integrated circuits.

Wireless circuitry 1118 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some embodiments, the wireless circuitry 1118 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A computer device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS. UMTS, CDMA2000 1×/EV-DO and LTE/LTE-Advanced) can be used depending on the type of communication or the range of the communication.

The wireless circuitry 1118 is coupled to a processing system 1114 via a peripherals interface 1116. The peripherals interface 1116 can include conventional components for establishing and maintaining communication between peripherals and the processing system 1114. Voice and data information received by the wireless circuitry 1118 (e.g., in speech recognition or voice command applications) is sent to one or more processors 1102 via the peripherals interface 1116. One or more processors 1102 are configurable to process various data formats for one or more application programs 1134 stored on the medium 1112.

The peripherals interface 1116 couples the input and output peripherals of the device to a processor 1102 and the computer-readable medium 1112. One or more processors 1102 communicate with the computer-readable medium 1112 via a controller 1120. The computer-readable medium 1112 can be any device or medium that can store code and/or data for use by one or more processors 1102. The medium 1112 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, the peripherals interface 1116, one or more processors 1102, and the memory controller 1120 can be implemented on a single chip, such as processing system 1114. In some other embodiments, they can be implemented on separate chips.

The computer device 1100 also includes a power system 1142 for powering the various hardware components. The power system 1142 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, the computer device 1100 includes a camera 1144. In some embodiments, the computer device 1100 includes sensors 1146. The sensors can include accelerometers, compass, gyrometer, pressure sensors, audio sensors, light sensors, barometers, and the like. The sensors 1146 can be used to sense location aspects, such as auditory or light signatures of a location.

In some embodiments, the computer device 1100 can include a GPS receiver, sometimes referred to as a GPS unit 1148. A computer device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the device. Based on these estimations, the device can determine a location fix, altitude, and/or current speed. A location fix can be geographical coordinates such as latitudinal and longitudinal information.

One or more processors 1102 run various software components stored in the medium 1112 to perform various functions for the device 1100. In some embodiments, the software components include an operating system 1122, a communication module (or set of instructions) 1124, a location module (or set of instructions) 1126, a playback app 1128, and other applications (or sets of instructions) 1134, such as a navigation app.

The operating system 1122 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

The communication module 1124 facilitates communication with other devices over one or more external ports 1136 or via wireless circuitry 1118 and includes various software components for handling data received from the wireless circuitry 1118 and/or external port 1136. The external port 1136 (e.g., USB, FireWire, Lightning connector, 30-pin connector, etc.) is adapted for coupling directly to other devices or indirectly over a network (e.g., the Internet, wireless LAN, etc.).

The one or more applications 1134 on the computer device 1100 can include any applications installed on the device, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), and the like. The one or more applications 1134 can also include a specific app for controlling playback of content items, updating the content item database, or any other suitable application.

There may be other modules or sets of instructions (not shown), such as a graphics module, a time module, and the like. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1116 can include a display system such as coupling to an external display, or can include an integrated display such as a flat panel display, or touch-sensitive display. The display 1116 displays visual output to the user in a GUI format. The visual output can include text, graphics, video, and any combination thereof. Some or all of the visual output can correspond to user-interface objects. The display can use LED (light emitting diode), LCD (liquid crystal display) technology, or LPD (light emitting polymer display) technology, although other display technologies can be used in other embodiments.

In some embodiments, the I/O subsystem 1116 can include a display and user input devices such as a keyboard, mouse, and/or trackpad. In some embodiments, the I/O subsystem 1116 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in the medium 1112) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, the computer device 1100 can include a touchpad for activating or deactivating particular functions. In some embodiments, the touchpad is a touch-sensitive area of the device that, unlike the touch screen, does not display visual output. The touchpad can be a touch-sensitive surface that is separate from the touch-sensitive display or can be an extension of the touch-sensitive surface formed by the touch-sensitive display.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method, comprising:
   simulating, by a development device operating system configured for executing on a development device, a first electronic device operating system configured for executing on a first electronic device, wherein the first electronic device is a first type of mobile device;
   generating, by a first electronic device application executing on the simulated first electronic device operating system, a command for a second electronic device application of a second electronic device executing on the simulated first electronic device operating system, such that the second electronic device application is simulated on the simulation of the first electronic device operating system,
   wherein the second electronic device is a second type of mobile device that is a different type from a type of the first electronic device,
   wherein the second electronic device application of the second electronic device corresponds to the first electronic device application of the first electronic device, and
   wherein the command includes a command type and data associated with the command type;
   processing, by a first electronic device framework of the first electronic device application, the command for the second electronic device application that is simulated, wherein the processing generates command data for the second electronic device by transforming the command for the second electronic device application that is simulated to a form that is usable by a simulation relay module executed by the simulated first electronic device operating system;
   routing, by the simulation relay module, the command data for the second electronic device to the second electronic device application that is simulated;
   displaying, by the development device operating system, a graphical user interface displaying data for the second electronic device application that is simulated on a simulated second electronic device and displaying data for the first electronic device application that is simulated on a simulated first electronic device, wherein the displayed data that is displayed on the graphical user interface is updated based on the command data that is sent to from the first electronic device to the second electronic device; and
   determining a status of the command passed between the first electronic device application executing on the simulated first electronic device operating system and the second electronic device application executing on the simulated first electronic device operating system during development of the first electronic device application and the second electronic device application.

2. The method of claim 1, further comprising displaying, by the development device operating system, data for the first electronic device application on a simulated first electronic device display.

3. The method of claim 1, wherein the command data for the second electronic device generated by the first electronic device framework includes:
   identifying information for the second electronic device application; and
   information associated with a command for the second electronic device.

4. The method of claim 1, further comprising:
   generating, by the second electronic device application, a command for the first electronic device;
   sending, by the second electronic device application, to a simulated second electronic device framework executing on the simulated first electronic device operating system, the command for the first electronic device;
   processing, by the simulated second electronic device framework, the command for the second electronic device application, wherein the processing generates command data by transforming the command for the first electronic device to a form that is usable by a first electronic device daemon executed by the simulated first electronic device operating system; and
   routing, by the first electronic device daemon, the command data for the first electronic device to the first electronic device application.

5. The method of claim 4, wherein the command data for the first electronic device generated by the simulated second electronic device framework includes:
   identifying information for the second electronic device application; and
   information associated with the command for the first electronic device.

6. The method of claim 1, further comprising receiving, by the second electronic device application, from the first electronic device application, an interface definition file for the second electronic device.

7. The method of claim 6, further comprising using the interface definition file to display, by the development device operating system, the simulated second electronic device display.

8. A computing device, comprising:
   one or more processors;
   a display communicatively coupled to the one or more processors;
   memory; and
   one or more programs, wherein the one or more programs are stored in the memory and configured to be executed by the one or more processors, the one or more programs including instructions for:

simulating, by a development device operating system configured for executing on the computing device, a first electronic device operating system configured for executing on a first electronic device, wherein the first electronic device is a first type of mobile device;

generating, by a first electronic device application executing on the simulated first electronic device operating system, a command for a second electronic device application of a second electronic device executing on the simulated first electronic device operating system, such that the second electronic device application is simulated on the simulation of the first electronic device operating system, wherein the second electronic device is a second type of mobile device that is a different type from a type the first electronic device, wherein the second electronic device application of the second electronic device corresponds to the first electronic device application of the first electronic device, and wherein the command includes a command type and data associated with the command type;

processing, by a first electronic device framework of the first electronic device application, the command for the second electronic device application that is simulated, wherein the processing generates command data for the second electronic device by transforming the command for the second electronic device application that is simulated to a form that is usable by a simulation relay module executed by the simulated first electronic device operating system;

routing, by the simulation relay module, the command data for the second electronic device to the second electronic device application that is simulated;

displaying, by the display of the computing device, a graphical user interface displaying data for the second electronic device application that is simulated on a simulated second electronic device and displaying data for the first electronic device application that is simulated on a simulated first electronic device, wherein the displayed data that is displayed on the graphical user interface is updated based on the command data that is sent to from the first electronic device to the second electronic device; and determining a status of the command passed between the first electronic device application executing on the simulated first electronic device operating system and the second electronic device application executing on the simulated first electronic device operating system during development of the first electronic device application and the second electronic device application.

9. The computing device of claim 8, wherein the one or more programs further include instructions for displaying, by the development device operating system, data for the first electronic device application on a simulated first electronic device display.

10. The computing device of claim 8, wherein the command data for the second electronic device generated by the first electronic device framework includes:

identifying information for the second electronic device application; and information associated with a command for the second electronic device.

11. The computing device of claim 8, wherein the one or more programs further include instructions for:

generating, by the second electronic device application, a command for the first electronic device;

sending, by the second electronic device application, to a simulated second electronic device framework executing on the simulated first electronic device operating system, the command for the first electronic device;

processing, by a first electronic device framework of the first electronic device application, the command for the second electronic device application, wherein the processing generates command data for the second electronic device by transforming the command for the second electronic device application to a form that is usable by a simulation relay module executed by the simulated first electronic device operating system;

routing, by the first electronic device daemon, the command for the first electronic device to the first electronic device application.

12. The computing device of claim 11, wherein the command for the first electronic device generated by the simulated second electronic device framework includes:

identifying information for the second electronic device application; and information associated with a command for the first electronic device.

13. The computing device of claim 8, wherein the one or more programs further include instructions for receiving, by the second electronic device application, from the first electronic device application, an interface definition file for the second electronic device.

14. The computing device of claim 13, wherein the one or more programs further include instructions for using the interface definition file to display, by the development device operating system, the simulated second electronic device display.

15. A non-transitory computer readable storage medium storing one or more programs, the one or more programs comprising instructions, which when executed by a computing device with one or more processors, a display, and memory, cause the computing device to:

simulate, by a development device operating system configured for executing on the computing device, a first electronic device operating system configured for executing on a first electronic device, wherein the first electronic device is a first type of mobile device;

generate, by a first electronic device application executing on the simulated first electronic device operating system, a command for a second electronic device application of a second electronic device executing on the simulated first electronic device operating system, such that the second electronic device application is simulated on the simulation of the first electronic device operating system wherein the second electronic device is a second type of mobile device that is a different type from a type of the first electronic device, wherein the second electronic device application of the second electronic device corresponds to the first electronic device application of the first electronic device, and wherein the command includes a command type and data associated with the command type;

process, by a first electronic device framework of the first electronic device application, the command for the second electronic device application that is simulated, wherein the processing generates command data for the second electronic device by transforming the command for the second electronic device application that is simulated to a form that is usable by a simulation relay module executed by the simulated first electronic device operating system;

route, by the simulation relay module, the command data for the second electronic device to the second electronic device application that is simulated;

display, by the display, a graphical user interface displaying data for the second electronic device application that is simulated on a simulated second electronic device and displaying data for the first electronic device application that is simulated on a simulated first electronic device, wherein the displayed data that is displayed on the graphical user interface is updated based on the command data that is sent to from the first electronic device to second electronic device; and determine a status of the command passed between the first electronic device application executing on the simulated first electronic device operating system and the second electronic device application executing on the simulated first electronic device operating system during development of the first electronic device application and the second electronic device application.

16. The non-transitory computer readable storage medium of claim 15, wherein the one or more programs further cause the device to display, by the development device operating system, data for the first electronic device application on a simulated first electronic device display.

17. The non-transitory computer readable storage medium of claim 15, wherein the command data for the second electronic device generated by the first electronic device framework includes:

identifying information for the second electronic device application; and information associated with a command for the second electronic device.

18. The non-transitory computer readable storage medium of claim 15, wherein the one or more programs further cause the device to:

generate, by the second electronic device application, a command for the first electronic device;

send, by the second electronic device application, to a simulated second electronic device framework executing on the simulated first electronic device operating system, the command for the first electronic device;

process, by the simulated second electronic device framework, the command for the second electronic device application, wherein the processing generates command data by transforming the command for the first electronic device to a form that is usable by a first electronic device daemon executed by the simulated first electronic device operating system; and route, by the first electronic device daemon, the command data for the first electronic device to the first electronic device application.

19. The non-transitory computer readable storage medium of claim 18, wherein the command data for the first electronic device generated by the simulated second electronic device framework includes:

identifying information for the second electronic device application; and information associated with the command for the first electronic device.

20. The non-transitory computer readable storage medium of claim 15, wherein the one or more programs further cause the device to receive, by the second electronic device application, from the first electronic device application, an interface definition file for the second electronic device.

21. The non-transitory computer readable storage medium of claim 20, wherein the one or more programs further cause the device to use the interface definition file to display, by the development device operating system, the simulated second electronic device display.

22. The method of claim 1, wherein one of the first electronic device and the second electronic device is a wearable device.

23. The method of claim 1, wherein the first electronic device operating system is simulated in a software development environment and the software development environment is configured to simulate the command from the simulated second electronic device on the first electronic device operating system that is simulated by the development device operating system.

24. The computing device of claim 8, wherein the computing device is a development device executing in a development environment.

25. The method of claim 1, wherein the development device operating system executes an integrated development environment (IDE).

* * * * *

UNITED STATES PATENT AND TRADEMARK OFFICE
CERTIFICATE OF CORRECTION

PATENT NO. : 9,946,560 B2
APPLICATION NO. : 14/517573
DATED : April 17, 2018
INVENTOR(S) : Forest A. Hill It is certified that error appears in the above-identified patent and that said Letters Patent is hereby corrected as shown below:

In the Claims

Claim 15, Line 48 (Column 23, Line 15): Insert --the-- after to.

Signed and Sealed this
Eighteenth Day of June, 2019

Andrei Iancu
*Director of the United States Patent and Trademark Office*